June 16, 1964  T. J. SCHOENECKER ETAL  3,137,475
MOTOR ACTUATED VALVE
Filed Sept. 1, 1961
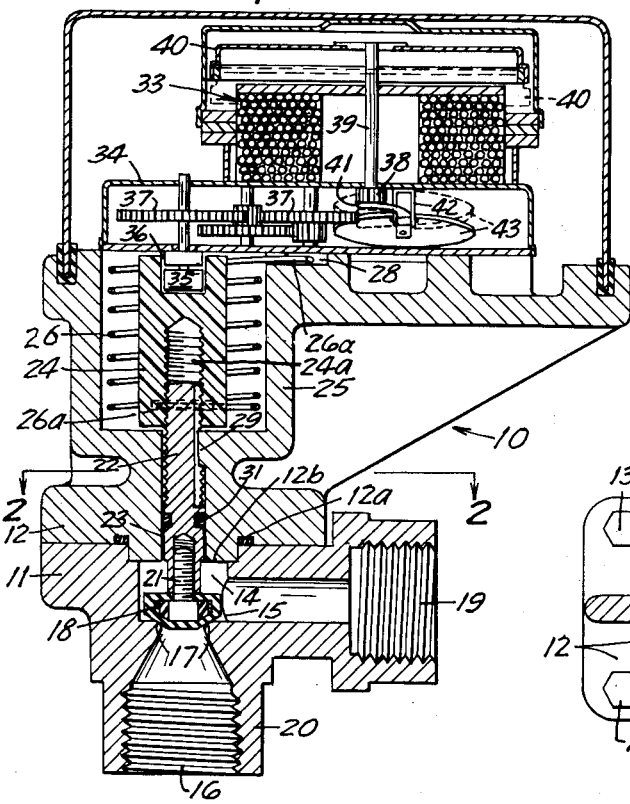
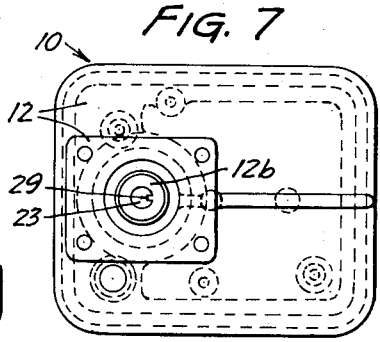
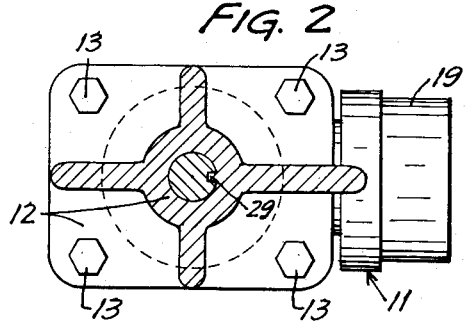
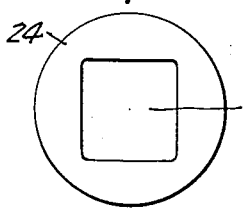
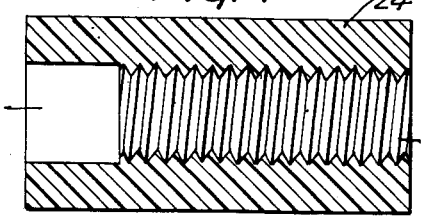
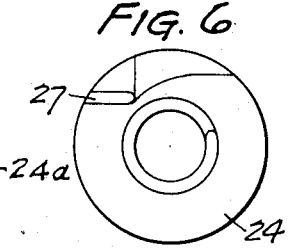
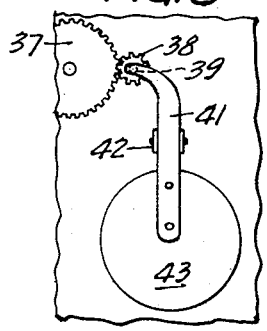
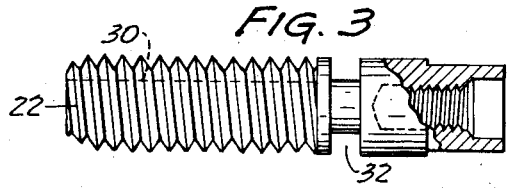
INVENTORS
THOMAS J. SCHOENECKER
RICHARD G. SIDEBOTTOM
BY
John E. Thyken
ATTORNEY

United States Patent Office 3,137,475
Patented June 16, 1964

3,137,475
MOTOR ACTUATED VALVE
Thomas J. Schoenecker, North St. Paul, and Richard G. Sidebottom, St. Paul, Minn., assignors to Union Tank Car Company, Chicago, Ill., a corporation of New Jersey
Filed Sept. 1, 1961, Ser. No. 135,604
10 Claims. (Cl. 251—69)

This invention relates to motor actuated valves, and has for its principal object to provide a valve of this class which is adapted to be operated electrically by remote control and has the advantages for some installations of embodying opening and closing mechanism which operates relatively slowly and noiselessly, thereby eliminating pressure surges in the flow system under control of the valve.

A particular object is to provide a simple and reliable valve of the class described having a threaded valve stem which is moved axially to open and close the valve, and is operatively connected to a motor and a coiled spring through connecting and guiding means of novel construction, whereby the valve stem is moved in one direction by the motor and in the other direction by the coiled spring, energy being stored in the spring by operation of the motor.

The invention also includes certain other novel features of construction which will be more fully pointed out in the following specification and claims.

Referring to the accompanying drawing which illustrates a preferred embodiment of our invention, by way of example and not for the purpose of limitation:

FIGURE 1 is a central vertical sectional view showing the valve in closed position;

FIG. 2 is a horizontal sectional view taken on the line 2—2 of FIG. 1;

FIG. 3 is a detail part elevational and part sectional view showing the valve stem;

FIG 4 is a detail sectional view of the stem operating nut taken along its axis of rotation;

FIGS. 5 and 6 are upper end and lower end views of the nut;

FIG. 7 is a bottom plan view showing the upper casing member, and

FIG. 8 is a fragmentary bottom view of the clutch means for releasing the gear train when the motor is deenergized.

In the drawing a two part casing is indicated generally by the numeral 10. This casing is composed of a lower member 11 which is connected to an upper member 12 by machine screws 13, as shown in FIG. 2. The casing member 11 forms a chamber 14 and ports 15 and 16 communicating with the chamber for flow of fluid through the chamber when the valve is in open position. The casing member 11 is also formed with an annular seat 17 for a valve closure member 18. As shown, tubular extensions 19 and 20 of the casing member 11 are provided for external connections with conduits of a flow system.

Closure member 18 is preferably a resilient compressible washer having an annular surface for contact with the seat 17 and is rigidly connected to a valve stem member 21. This stem member has a normally fixed thread connection with a main stem 22 which is movable longitudinally in a cylindrical bore 23 formed in the casing member 12. An elongated upper end portion of the main stem 22 is externally threaded and has a threaded connection with an elongated nut 24. This nut is preferably enclosed in a substantially cylindrical enlargement of housing member 25 of the casing member 12. The nut 24 is formed with an internally threaded bore 24a into which the main stem 22 may be retracted when the valve is moved to open position.

Confined in the housing member 25 at the outer periphery of the nut 24 is a coiled spring 26 having a normally lower end portion 26a fitting in a socket 27 formed in the nut 24, as indicated in FIG. 6. An upper end portion 26b of the spring 26 is anchored to the casing member 12 in a socket 28 formed therein. To prevent rotary movement of the stem member 22 in relation to the valve casing, the latter is formed with an elongated lug 29 which projects into a longitudinally extending guide groove 30 formed in the stem 22. The lug 29 fits loosely in the groove 30 so that the stem 22 and closure member 18 are free to move longitudinally of the stem relative to the casing, selectively toward and away from the seat 17. A sealing ring 31 is confined in an annular recess 32 formed in the main stem 22 to slidably engage the cylindrical bore 23 and thereby seal the bore against leakage of fluid under pressure along the stem 22.

The joint between the casing members 11 and 12 is sealed by a ring 12a confined in an annular recess in the member 12. At the upper side of the chamber 14 casing member 12 is formed with an annular stop surface 12b for engagement with the upper side of closure member 18 when the latter is moved to its fully open position.

An electric motor 33 is operatively connected to the nut 24 by a speed reducing gear train in a housing 34 and a driving shaft 35 projecting from the housing 34 in coaxial relation to the nut 24. The lower end portion of the shaft 35 is preferably square in cross section and fits in a rectangular recess 36 (FIGS. 4 and 5) formed in the upper end portion of the nut 24.

The gear train, indicated generally by the numeral 37, includes a pinion 38 fixed on the lower end of a motor shaft 39 which is rotated when the motor coils are energized. This shaft is also movable longitudinally to and from a position in which the pinion 38 is in mesh with another gear of the train 37. At its upper end the shaft 39 is fixed on a rotor 40 and the latter is moved by magnetic attraction from the full line to the broken line position indicated in FIG. 1 when the motor is energized. A counter-balance lever 41 is disposed to engage the lower end of the shaft 39 and is pivotally supported on a small bracket 42 intermediate its ends. The end of the lever 41 remote from the shaft 39 carries a counter-weight 43.

In operation, assuming that the ports 15 and 16 are connected to conduits of a flow system, when the motor 33 is deenergized the closure member 18 is held on its seat 17, thereby cutting off flow between the ports 15 and 16. The counter-weight 43 acting through the lever 41 holds the motor shaft 39 and pinion 38 in their elevated positions wherein the pinion 13 is disengaged from the gears of the train 37. To open the valve, current is passed through the coils of the motor 33 and the rotor 40 is moved down to its broken line position by magnetic attraction, thereby moving the pinion 38 into mesh with the gear train 37. The motor 33 now operates to rotate the shaft 35 through the gear train 37, thereby turning the nut 24 in the direction which draws the stem 22 upwardly into the threaded bore 24a. Upward movement of the stem 22 and the closure member 18 continues until the upper surface of the member 18 engages the stop surface 12b of the casing member 12. Rotation of the nut 24 is thereby stopped and the motor 33 is stalled. The valve is now held in its open position as long as the motor is energized. During the upward movement of the valve stem, energy is stored in the coiled spring 26 by winding this spring in such a direction as to cause the nut 24 to be biased toward valve closing position. The circuit for energizing the motor 33 is merely opened to de-energize the motor when the valve is to be moved to its closed position. Deenergization of the motor releases the rotor 40 so that it is free to be moved upwardly by the counterweight 43 acting through the lever 41. Thereupon this lever moves the pinion 38 out of mesh with the coacting gear of the train 37 so that the shaft 35 is free to spin in the reverse direction under the torque exerted by the coiled spring 26. When thus released, the spring 26 rotates the nut 24 having the threaded connection with the stem 22, and the stem carrying the closure member 18 is moved downwardly until the member 18 contacts the annular seat 17, thereby closing the valve.

Our speed reducing gear train and the threaded connection between the nut 24 and stem 22 are so designed as to insure a relatively slow opening and closing movement of the valve. Adequate power to move the valve closure member against high pressure heads is also thereby made available while utilizing a relatively small motor. As a further advantageous result, we eliminate hydraulic surges in the flow system, and the opening and closing of the valve is noiseless.

We claim:

1. A power actuated valve comprising, a casing defining a chamber, ports for flow of fluid to and from said chamber, and an annular valve seat; a closure member adapted to coact with said seat for selectively interrupting flow between said ports; a screw threaded stem operatively connected to said closure member; a nut having a threaded connection with said stem and supported from the casing so as to be rotatable about its axis for moving said stem longitudinally of its axis; guide means on said casing and stem for restraining said stem against rotation relative to said casing and limiting movement thereof to longitudinal movement toward and away from said seat; a stop member in said casing for limiting movement of said closure member away from said seat; a motor for turning said nut; means for operatively connecting said motor to said nut and adapted to rotate the nut in one direction when the motor is energized; a coil spring operatively connected to said casing and nut for rotating it in the opposite direction when said motor is deenergized; and mean operative when the motor is deenergized for releasing said nut for rotation by energy stored in said spring.

2. A valve in accordance with claim 1 in which said closure member comprises an annular resilient compressible washer fixed on an end of said stem for sealing contact with said seat.

3. A valve in accordance with claim 1 in which said casing is formed with a substantially cylindrical bore containing said valve stem and including annular sealing means interposed between the stem and bore for preventing escape of fluid under pressure along said stem.

4. A valve in accordance with claim 1 in which said casing includes a substantially cylindrical housing for said nut and coiled spring, one end of the spring being operatively connected to the nut in said housing and the other end of the spring being anchored to the housing.

5. A valve in accordance with claim 1 in which said motor is adapted to be stalled upon contact of said closure member with said stop member.

6. A valve in accordance with claim 5 in which said means for operatively connecting the motor to the nut includes a speed reduction gear train which is operative to retain the nut in contact with said stop means when the motor is energized and stalled.

7. A valve in accordance with claim 6 in which said means operative when the motor is deenergized for releasing said nut comprise means for disconnecting said gear train from the motor when the motor is deenergized.

8. A power actuated valve comprising, a casing defining a chamber, ports for flow of fluid to and from said chamber, and an annular valve seat; a closure member adapted to coact with said seat for selectively interrupting flow between said ports; stem means fixedly secured to said closure member and including a threaded portion, guide means on said stem means and casing guiding said stem means in axial movement and restraining said stem means from rotation, rotatable stem driving means located in said casing and having a threaded part coacting with the threaded portion of said stem means for axially moving said stem means to seat or unseat said closure member, motor means drivingly connected to said stem driving means and operative to rotate said driving means in a first direction to unseat said closure member, energy storage means interconnecting said stem driving means and said casing for storing energy during operation of said motor means and operative to rotate said driving means in a second direction to seat said closure member, and means operative to release said driving means to cause said stem means to rotate in said second direction under the control of said energy storage means.

9. The valve structure of claim 8 wherein said last named means includes means operative in response to deenergization of said motor means.

10. The valve structure of claim 8, wherein said guide means includes a key defined on said casing and a keyway defined in said stem means.

References Cited in the file of this patent

UNITED STATES PATENTS 2,738,033     Towle _____ Mar. 13, 1956

FOREIGN PATENTS 31,016     Germany _____ of 1884